United States Patent
Schornstein et al.

(10) Patent No.: US 10,167,369 B2
(45) Date of Patent: Jan. 1, 2019

(54) LIGHTFAST POLYURETHANE PREPREGS AND FIBER COMPOSITE ELEMENTS PRODUCED THEREFROM

(71) Applicant: Covestro Deutschland AG, Leverkusen (DE)

(72) Inventors: Marcel Schornstein, Neuss (DE); Florian Hupka, Düsseldorf (DE); Dirk Wegener, Monheim (DE); Harald Rasselnberg, Dormagen (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 15/507,635

(22) PCT Filed: Aug. 25, 2015

(86) PCT No.: PCT/EP2015/069422
§ 371 (c)(1),
(2) Date: Feb. 28, 2017

(87) PCT Pub. No.: WO2016/030359
PCT Pub. Date: Mar. 3, 2016

(65) Prior Publication Data
US 2017/0306116 A1   Oct. 26, 2017

(30) Foreign Application Priority Data
Aug. 29, 2014 (EP) .................... 14182765

(51) Int. Cl.
| | | |
|---|---|---|
| C08J 5/24 | (2006.01) | |
| C08J 5/04 | (2006.01) | |
| C08G 18/42 | (2006.01) | |
| B29B 11/16 | (2006.01) | |
| C03C 25/326 | (2018.01) | |

(52) U.S. Cl.
CPC ................. C08J 5/24 (2013.01); B29B 11/16 (2013.01); C03C 25/326 (2013.01); C08G 18/425 (2013.01); C08J 5/043 (2013.01); C08J 2375/04 (2013.01)

(58) Field of Classification Search
CPC .......... C08J 5/24; C08J 5/043; C08J 2375/04; B29B 11/16; C03C 25/326; C08G 18/425
See application file for complete search history.

(56) References Cited

U.S. PATENT DOCUMENTS

| 2014/0087196 A1 | 3/2014 | Lindner et al. |
| 2015/0050503 A1 | 2/2015 | Hupka et al. |
| 2015/0080530 A1 | 3/2015 | Hupka et al. |

FOREIGN PATENT DOCUMENTS

| WO | WO 2012/163845 A1 | 12/2012 |
| WO | WO 2013/139704 A1 | 9/2013 |
| WO | WO 2013/139705 A1 | 9/2013 |

OTHER PUBLICATIONS

International Search Report and Written Opinion for International Application No. PCT/EP2015/069422, European Patent Office, dated Dec. 10, 2015.

*Primary Examiner* — Rabon A Sergent
(74) *Attorney, Agent, or Firm* — K&L Gates LLP

(57) ABSTRACT

The present invention relates to storage-stable prepregs (preimpregnated fibers) on the basis of lightfast, low-viscous polyurethane systems with an increased characteristic number and flat fiber composite components (molded bodies; composite compounds) produced therefrom, which can be obtained by methods of impregnation of, for example, woven fabrics and laid scrims, and to a method for the production thereof. The polyurethane system can comprise a reaction product of a reaction mixture of an isocyanate component and a polyol formulation. The isocyanate component comprises an organic isocyanate. The polyol formulation comprises a polyol component, a dianhydrohexitol, a latent catalyst, and optionally auxiliaries and/or additives.

11 Claims, No Drawings

LIGHTFAST POLYURETHANE PREPREGS AND FIBER COMPOSITE ELEMENTS PRODUCED THEREFROM

CROSS-REFERENCE TO RELATED APPLICATIONS

This application is a U.S. national stage application, filed under 35 U.S.C. § 371, of PCT/EP2015/069422, which was filed on Aug. 25, 2015, and which claims priority to European Patent Application No. EP 14182765.9, which was filed on Aug. 29, 2014, the contents of each of which are incorporated by reference into this specification.

FIELD

The present invention relates to storage-stable prepregs (preimpregnated fibers) based on lightfast low-viscosity polyurethane systems with relatively high index and to sheet-like fiber-composite components (moldings; composite components) produced therefrom, these being obtainable via impregnation processes from by way of example woven fabrics and laid scrims, and also to a process for production of these.

BACKGROUND

Fiber-reinforced materials in the form of prepregs are already used in many industrial applications because they are convenient to handle and because of increased processing efficiency in comparison with the alternative wet lamination technology ("wet-lay-up" technology).

Demands of industrial users of systems of this type are not only good handling but also longer shelf lives and lightfastness, and also shorter cycle times, and prepreg-hardening temperatures that are low and more energy-efficient.

This requires matrix components that permit the production of prepregs that can be stored and that have properties sufficiently stable for further processing. To this end, the prepregs cannot be tacky. It is moreover not permissible that they have been fully hardened. It is permissible only that the resin matrix has been prepolymerized, i.e. it must remain fusible. Requirements placed upon the crosslinked resin matrix consist in a high level of adhesion at interfaces in respect of the reinforcing materials and insert components, and where appropriate also in respect of other materials, such as metallic or ceramic materials. In the crosslinked state there are also requirements for high chemical stability and heat resistance.

Alongside polyesters, vinyl esters, and epoxy systems there are many specialized resins in the field of crosslinking matrix systems. Among these are also polyurethane resins, which are used by way of example for the production of composite materials by way of SRIM (structural reaction injection molding) processes or pultrusion processes because they are tough, damage-tolerant, and robust. Polyurethane composites also have superior toughness in comparison with vinyl esters, unsaturated polyester resins (UPE), or UPE-urethane hybrid resins.

Prepregs and composite components produced therefrom, based on epoxy systems, are described by way of example in WO 98/50211.

WO 2006/043019 describes a process for the production of prepregs based on epoxy resin polyurethane powders.

DE-A 102010029355 describes a process for the production of storage-stable polyurethane prepregs, and describes moldings produced therefrom, these being obtainable via a direct-melt-impregnation process from fiber-reinforced materials with use of reactive polyurethane compositions. The in essence aliphatic polyisocyanates used here are either internally blocked (e.g. as uretdione) and/or blocked by external blocking agents. The reactive resin mixtures can be used at temperatures of from 80 to 120° C. in the direct-melt-impregnation process. The disadvantage is that the hardening temperature is from 120° C. to 200° C., depending on the system, and the hardening time/cycle time is very long, being up to 60 minutes, with resultant high energy costs and high production costs. The examples use a leveling additive, and it can therefore be assumed that the systems described have high viscosities.

WO 2013/139704 A1 describes impregnation of reinforcing fibers with a very low-viscosity polyurethane system with high index, for the production of PUR prepregs that are storage-stable but nevertheless reactive. These prepregs have the disadvantage that they are unsuitable for weathering-resistant, lightfast applications. Another disadvantage is that the processing time is dependent on the mass of the mixture produced. An increase in the mass of the mixture leads to a reduction of processing time (potlife). Potlife is the period between mixing of the components and impregnation of the reinforcing fibers by the as yet not fully reacted matrix material.

There are also known prepregs based on pulverulent thermoplastics as matrix. US-A 20040231598 describes a method in which the particles are passed through a specific acceleration chamber with electrostatic charging. This apparatus serves for the coating of glass substrates, aramid substrates, or carbon-fiber substrates for the production of prepregs from thermoplastic resins. Resins mentioned are polyethylene (PE), polypropylene (PP), polyetheretherketone (PEEK), polyether sulfone (PES), polyphenyl sulfone (PPS), polyimide (PI), polyamide (PA), polycarbonate (PC), polyethylene terephthalate (PET), polyurethane (PU), polyester, and fluoropolymers. The thermoplastic prepreg textiles produced therefrom exhibit inherent toughness, good, viscoelastic damping behavior, unrestricted shelf life, good chemicals resistance, and recyclability.

Composite components with a matrix based on 2-component polyurethanes (2-C PUR) are likewise known. The 2-C PUR category comprises in essence the traditional reactive polyurethane resin systems. In principle, the system has two separate components. Whereas the main constituent of one of the components is always a polyisocyanate, the main constituents of the second component are polyols or amino- or amine-polyol mixtures. The two parts are mixed with one another only briefly prior to processing. The chemical hardening reaction then takes place via polyaddition with formation of a network made of polyurethane or polyurea. 2-C PUR systems have a restricted processing time (potlife) after the mixing of the two constituents, since the exothermic reaction that begins leads to gradual viscosity increase and finally to the gelling of the system. There are numerous variables here that determine the effective time available for processing: reactivity of the reactants, catalysis, concentration, solubility, moisture content, NCO/OH ratio, and ambient temperature being the most important [Lackharze [Coating resins], Stoye/Freitag, Hauser-Verlag 1996, pp. 210/212]. The disadvantage of the prepregs based on 2-C PUR systems of this type is that there is only a short time available for the processing of the prepreg to give a composite. Prepregs of this type are therefore not storage-stable over a plurality of hours, or indeed days.

JP-A 2004196851 describes composite components which are produced from carbon fibers and from organic fibers, e.g. hemp, with use of a matrix made of 2-C PUR based on polymeric methylenediphenyl diisocyanate (MDI) and on specific compounds containing OH groups.

WO 2003/101719 describes polyurethane-based composite components and methods for producing same. 2-C polyurethane resins are involved, with defined viscosities in the range from 300 to 2000 mPas, and with particular gel times of from 3 to 60 minutes.

There are also known physically-drying systems based on non-reactive PUR elastomers. Relatively high-molecular-weight, linear, thermoplastic polyurethanes are involved here, derived from diols and from diisocyanates, preferably MDI, TDI, HDI, and IPDI. These thermoplastic systems generally have very high viscosities, and therefore also have very high processing temperatures. This greatly increases the difficulty of use for prepregs. The use of powders in reactive systems in the production of prepregs with fiber composites is rather unusual, and has hitherto been restricted to a small number of application sectors.

Probably the most commonly used process for applying a powder to a fiber surface is the fluidized bed process (fluidized bed impregnation). Powder particles subjected to an upward-directed flow pattern assume fluid-like properties. This method is used in EP-A 590702. Here, individual fiber bundles are opened to release the strands, which are coated with the powder in the fluidized bed. The powder here is composed of a mixture of reactive and thermoplastic powder, in order to optimize the properties of the matrix. Individual rovings (fiber bundles) are finally brought together, and a plurality of layers are pressed for about 20 minutes at a pressure of 16 bar. The temperatures vary between 250 and 350° C. However, irregular coating is frequently encountered in the fluidized-bed process, in particular when the strands are not completely separated from one another.

In this connection, US-A 20040231598 presents a method which functions similarly to the fluidized bed process. Here, an air stream transports the particles to the substrate, and a specific structure is used for uniform deposition of the powder.

DE-A 102009001793 and DE-A 102009001806 describe a process for the production of storage-stable prepregs in essence composed of at least one fibrous support and of at least one reactive pulverulent polyurethane composition as matrix material.

WO 2012/022683 describes fiber-composite components and a process for production of these. The polyurethane used to saturate the fiber layer is produced from a reaction mixture. The reaction mixture comprises, as essential constituent, one or more polyepoxides, alongside polyisocyanates, polyols, and optionally additives. The polyurethane described in said document has the disadvantage of shelf life that is not adequate for the production of prepregs, being characterized by way of example by a low glass transition temperature. This PUR system moreover does not have the NCO value required for postcrosslinking to give finished components.

SUMMARY

It was an object of the present invention to find a matrix material which exhibits better lightfastness than aromatic PUR prepreg systems, and which has very low initial viscosity in order to ensure good wetting of the fibrous support, and which has sufficiently long processing time between the mixing of the components and the impregnation of the reinforcing fibers by the as yet not fully reacted matrix material. Another object of the invention was to provide prepregs which can be produced by means of a simple process, are storage-stable for a plurality of weeks, have low hardening temperatures, and harden rapidly, so that short cycle times are obtained. The prepregs are moreover intended to be only slightly tacky, so that they can easily be further processed.

DETAILED DESCRIPTION

Surprisingly, it has been found that production of prepregs that are lightfast and storage-stable but nevertheless reactive is achieved via impregnation of reinforcing fibers with an aliphatic polyurethane system with low viscosity. When the prepregs of the invention are compared with the prepregs described, for example, in DE-A 102010029355 (WO 2011/147688) and in WO 2013/139704 A1, they exhibit improved production properties and improved processing properties, and also shorter cycle times.

The invention therefore provides prepregs comprising a sheet-like fiber layer saturated with polyurethane (matrix material) that has not been fully hardened and that has an NCO value of from 3% by weight to 17% by weight (measured in accordance with DIN EN ISO 14896:2009-07-method A: method A=NCO value determined by titration), and that has a $T_g$-value below 40° C., preferably not more than 35° C. (glass transition temperature $T_g$ measured in accordance with DIN EN ISO 53765-A-20), where the polyurethane is obtainable from a reaction mixture composed of an isocyanate component made of A) one or more organic isocyanates from the group consisting of unblocked aliphatic or cycloaliphatic di- and polyisocyanates, polymeric homologs of these, of isocyanurates of these and also blends thereof, and a polyol formulation composed of B) a polyol component made of one or more polyols, preferably one or more polyester polyols, with a number-average OH number of from 30 to 1000 mg KOH/g, with a number-average functionality of from 1.9 to 2.5, C) one or more dianhydrohexitols, D) one or more latent catalysts which are catalytically active at temperatures of from 50° to 100° C., E) optionally auxiliaries and/or additives, other than polyepoxides, where the initial viscosity of the reaction mixture at 40° C. is from 2300 to 3200 mPas (measured in accordance with DIN EN ISO 53019), preferably from 2400 to 3000 mPas, particularly preferably from 2500 to 2850 mPas, and the ratio of the number of the NCO groups in component A) to the number of the OH groups in component B) and C) is from 1.3:1 to 10:1, preferably from 1.4:1 to 5.7:1.

The NCO value of the polyurethane that has not been fully hardened gives the proportion by weight of unreacted isocyanate groups in the prepreg. This NCO value is moreover an indicator of the shelf life of the prepregs. To determine the shelf life of the prepreg, the NCO value is determined over a period of a plurality of weeks.

The NCO value of the storage-stable prepregs is determined weekly over a period of 7 weeks. The NCO value of the prepregs of the invention is in a range from 3% by weight to 17% by weight, preferably from 4% by weight to 15% by weight, and very particularly preferably from 4.5% by weight to 12% by weight. Even without addition of external blocking agents or what are known as stoppers, the NCO value of the prepregs of the invention changes by less than 4.5% over a period of 7 weeks. The NCO value is determined in accordance with DIN EN ISO 14896:2009-07 method A.

The invention further provides sheet-like fiber-composite components comprising at least one prepreg of the invention, where the prepreg(s) has/have been fully hardened.

Preference is given to sheet-like fiber-composite components which also have, in addition to the prepreg layer of the invention, a prepreg layer which is composed of a sheet-like fiber layer and of a fully hardened polyurethane based on aromatic isocyanates.

The present invention further provides a process for the production of the prepregs of the invention which is characterized in that
  i) components B) to E) are mixed at temperatures from 40° to 80° C., preferably from 50° to 70° C., to produce a polyol formulation X,
  ii) the polyol formulation X from step i) is mixed with component A) at temperatures from 10° to 80° C. to produce a reactive mixture,
  iii) the reactive mixture from ii) is applied to a sheet-like fiber layer and to some extent cured.

The fiber layer is therefore impregnated by the reactive mixture.

The invention further provides a process for the production of the fiber-composite components of the invention which is characterized in that
  one or more prepregs produced in the invention is/are fully hardened at from 110° to 140° C. and at a pressure of from 1 to 100 bar, preferably from 1 to 50 bar, particularly preferably from 1 to 10 bar or in vacuo within from 1 to 10 minutes, preferably from 1 to 5 minutes.

The viscosities are determined in accordance with DIN EN ISO 53019 (plate-on-plate).

The prepregs of the invention or the fiber-composite components produced therefrom can be used for the production of sandwich components which are composed of core sublayers and surface layers, for lightweight construction solutions in various applications in the construction industry, the automobile industry (e.g. bodywork components), the aerospace industry (e.g. aircraft construction), road construction (e.g. manhole covers), power engineering (e.g. rotor blades of wind turbines, solar reflectors), in boatbuilding and shipbuilding, and in structures exposed to high loads, and also in Baypreg® technology. The sandwich components mentioned can also be produced by using prepregs based on sheet-like fiber layers and on polyurethanes that have not been fully hardened and are based on aromatic isocyanate components. Fiber-composite components can also be produced by using combinations of the prepregs of the invention with prepregs based on sheet-like fiber layers and on polyurethanes that have not been fully hardened and are based on aromatic isocyanate components.

The essence of the principle of the impregnation process for the production of the prepregs is that a reactive polyurethane composition is first produced from the individual components A), B), C), D), and E). Components B), C), D), and E) are mixed in advance at from 40 to 80° C. to give a polyol formulation. The homogeneous mixture is then mixed with component A) at temperatures below 80° C. (preferably from 10° to 75° C.). This reactive polyurethane composition is then applied directly at room temperature to the fibrous support (sheet-like fiber layer), i.e. the fibrous support is impregnated by the polyurethane system produced from A), B), C), D), and E). The storage-stable prepregs can then be further processed at a subsequent juncture to give fiber-composite components. Very good impregnation of the fibrous support is achieved by the very low-viscosity polyurethane system of the invention. Any further crosslinking reaction due to heating of the polyurethane composition is avoided because the operations take place at room temperature. The impregnation process can use various methods. By way of example, the polyurethane system can be applied on a roll mill or by means of a doctor.

An advantage of the reaction mixtures used in the invention is the mixing of component A) with the mixture of B), C), D), and E) at low temperatures of from 10° C. to 80° C., preferably of from 20° C. to 60° C., and particularly preferably of from 20° C. to 40° C., in such a way as to avoid any cumulative exothermic effect even when a polyurethane system has relatively large mass, and to maintain low viscosity of the reaction mixture, and thus to permit successful application of the reaction mixture to the support material. In the aliphatic-based systems used hitherto, it is necessary to mix the components at temperatures at from 80° C. to 120° C., and this is problematic because the reactive matrix material begins to react. In the case of the aromatic systems, the increase of the mass of the polyurethane matrix leads to reduced potlife or processing time (period between mixing of the components and impregnation of the reinforcing fibers with the as yet not fully hardened matrix material).

The reaction mixtures used in the invention are unlike the reaction mixtures used in DE-A 102010029355 in requiring neither external blocking agents nor blocked isocyanate components. The reaction mixtures used in the invention permit rapid hardening of the prepregs at low temperatures and rapid manufacture of the fiber-composite components.

The reaction mixture used in the invention can be produced in casting machines with static mixers or with dynamic mixers, since only a short mixing time is required. This is a major advantage in the production of the fiber-composite components of the invention, because for good saturation the reactive resin mixture has to have minimum viscosity. A mixture which requires some minutes for prior mixing already has too high a viscosity, due to the formation of urethane groups.

The prepregs produced in the invention have, after cooling, a very long shelf life of a plurality of weeks. The prepregs thus produced are only slightly tacky, and can therefore easily be further processed.

DE-A 102010029355 describes the addition of a leveling additive, and it can therefore be assumed that the reactive resin systems have high viscosity. The polyurethane systems of the invention have low viscosities of from 2300 to 3200 mPas at 40° C., and it is therefore unnecessary to add leveling additives, and good saturation of the fibers is nevertheless achieved.

Another advantage of the reaction systems used in the invention is that use of aliphatic polyisocyanates gives significantly increased lightfastness.

The prepregs can be processed in the form of a layer and in the form of a plurality of mutually superposed layers, to give a fiber-composite component. Prior to the crosslinking of the matrix material, the prepregs are preferably cut to size, optionally stitched or otherwise fixed, and pressed in a suitable mold at superatmospheric or atmospheric pressure, or optionally with application of vacuum. For the purposes of the present invention, this procedure for the production of the fiber-composite components from the prepregs takes place at temperatures below 140° C., preferably from 60° to 140° C., particularly preferably from 70° to 135° C., as required by hardening time.

During the processing of the prepregs to give the fiber-composite components (e.g. via pressing at elevated temperatures), very good impregnation of the fibrous reinforcing material takes place, due to melting of the, initially incipiently reacted, matrix material to give a low-viscosity polyurethane composition, before the entire polyurethane matrix cures as a result of the full crosslinking reaction of the polyurethane composition at elevated temperatures. It is preferable that a release agent is provided to the mold cavity prior to the pressing of the prepreg. It is possible to introduce other protective or decorative layers, for example one or more gelcoat layers, into the mold before the fiber material is introduced for the production of the prepreg.

Particular preference is given to a fiber-composite component which comprises, in the fiber layer, a polyurethane obtainable from from 59 to 92% by weight, preferably from 61 to 86.5% by weight, of unblocked polyisocyanates (A), from 5 to 26% by weight, preferably from 8.5 to 24.5% by weight, of polyols (B), from 2.6 to 12.7% by weight, preferably from 4.2 to 12.3% by weight, of dianhydrohexitols (C), from 0.3 to 1.8% by weight, preferably from 0.6 to 1.7% by weight, of catalyst (D), and from 0 to 3% by weight, preferably from 0.1 to 0.5% by weight, of additives (E), where the sum of the proportions by weight of components is 100% by weight.

The proportion of fiber in the fiber-composite part is preferably more than 45% by weight, with particular preference more than 50% by weight, based on the total weight of the fiber-composite component.

The usual unblocked aliphatic and cycloaliphatic di- and/or polyisocyanates are used as isocyanate component A). Examples of these suitable polyisocyanates are butylene 1,4-diisocyanate, pentane 1,5-diisocyanate, hexamethylene 1,6-diisocyanate (HDI), isophorone diisocyanate (IPDI), trimethylhexamethylene 2,2,4- and/or 2,4,4-diisocyanate, the isomeric bis(4,4'-isocyanatocyclo-hexyl)methanes, and mixtures of these having any desired isomer content. It is also preferably possible to use isocyanurates made of HDI or made of IPDI and/or of homologs of these, and also blends of these isocyanurates. The NCO content of the polyisocyanate used should preferably be above 15% by weight, with preference above 20% by weight. The viscosity of the isocyanate should preferably be ≤35 000 mPas (at 25° C.), with preference ≤32 000 mPas (at 25° C.), and with particular preference ≤30 000 mPas (at 25° C.).

If a single polyol is added, the OH number of component B) gives the OH number thereof. In the case of mixtures, the OH number of the mixture is stated. This value can be determined with reference to DIN EN ISO 53240.

The average OH number of the polyol component (polyol or polyol mixture) B) is from 30 to 1000 mg KOH/g, preferably from 50 to 300 mg KOH/g, and particularly preferably from 60 to 250 mg KOH/g. The average functionality of the polyol component used is preferably from 1.9 to 2.5.

It is possible in the invention to use polyether polyols, polyester polyols, or polycarbonate polyols as polyol component B), preference being given to polyester polyols. Examples of polyester polyols that can be used in the invention are condensates of 1,4-butanediol, ethylene glycol, and adipic acid.

Polyol component B) can also comprise fibers, fillers, and polymers.

Dianhydrohexitols can by way of example be produced via elimination of two molecules of water from hexitols, e.g. mannitol, sorbitol, and iditol. These dianhydrohexitols are known as isosorbide, isomannide, and isoidide, and have the following formula:

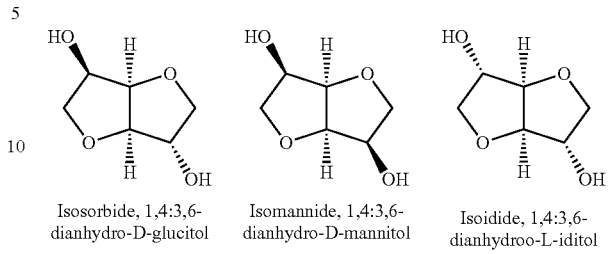

Isosorbide, 1,4:3,6-dianhydro-D-glucitol

Isomannide, 1,4:3,6-dianhydro-D-mannitol

Isoidide, 1,4:3,6-dianhydroo-L-iditol

Particular preference is given to isosorbide. Isosorbide is obtainable by way of example as Polysorb® P from Roquette, or as Addolink® 0312 from Rhein Chemie. It is also possible to use mixtures of the abovementioned compounds.

As latent catalysts D) it is preferable to use catalysts which are catalytically active in the range from 50° C. to 100° C. Examples of typical latent catalysts are blocked amine and amidine catalysts from the producers Air Products (e.g. Polycat® SA-1/10, Dabco KTM 60) and Tosoh Corporation (e.g. Toyocat® DB 2, DB 30, DB 31, DB 40, DB 41, DB 42, DB 60, DB 70). However, it is also possible to use any of the other, typical latent catalysts from polyurethane chemistry with what is known as a switch temperature of from 50° C. to 100° C.

Auxiliaries and/or additives E) can optionally be added. These are by way of example deaerators, antifoams, release agents, fillers, flow aids, organic or inorganic dyes, blowing agents, and reinforcing materials. Other known additives and additions can be used if necessary. Polyepoxides are not used.

Fiber material for the sheet-like fiber layer used can be sized or unsized fibers, for example glass fibers, carbon fibers, metal fibers (e.g. steel fibers or iron fibers), natural fibers, aramid fibers, polyethylene fibers, basalt fibers, or carbon nanotubes (CNTs). Carbon fibers are particularly preferred. The fibers can be used as short fibers of length from 0.1 to 50 mm. Preference is given to continuous-filament-fiber-reinforced composite components obtained by using continuous fibers. The arrangement of the fibers in the fiber layer can be unidirectional, random, or woven. In components with a fiber layer made of a plurality of sublayers, there may be sublayer-to-sublayer fiber orientation. It is possible here to produce unidirectional fiber layers, cross-laid layers, or multidirectional fiber layers, where unidirectional or woven sublayers are mutually superposed. Particular preference is given to semifinished fiber products in the form of fiber material which is by way of example woven fabrics, laid scrims, braided fabrics, mats, nonwovens, knitted fabrics, or 3D semifinished fiber products.

The invention will be explained in more detail with reference to the examples below.

EXAMPLES

Storage-stable prepregs made of the systems of the invention, made of unblocked polyisocyanates, polyols, additives, and latent catalysts, were produced and then hardened to give a fiber-composite component, and compared with prepregs/composite components made of polyurethane systems made of internally blocked polyisocyanate and polyol. For the production of the prepreg by impregnation, a thin film of the polyurethane system was applied to the glassfiber textile and distributed on the surface in such a way as to achieve about 55% by weight of glassfiber content, based on the subsequent component. The prepregs were then packed in a vacuum bag and stored at −18° C. The prepregs were removed from the bag and then pressed at 130° C. and 5 bar within a period of five minutes to give a fiber-composite component. Glassfiber content was determined via ashing of the test samples in accordance with DIN EN ISO 1172.

The NCO/OH ratio gives the ratio of the number of NCO groups in polyisocyanate component A) to the number of OH groups in components B) and C).

Starting Compounds Used:

Component A): Desmodur® XP 2489 (unblocked polyisocyanate from Bayer MaterialScience AG; mixture of isophorone diisocyanate and hexamethylene 1,6-diisocyanate; NCO content 21% by weight; viscosity at 25° C.: 29 500 mPas)

Component A'): Desmodur® VP.PU 60RE11 (unblocked polyisocyanate from Bayer MaterialScience AG; mixture of diphenylmethane diisocyanate and polyphenylene polymethylene polyisocyanate; NCO-content 32.6% by weight; viscosity at 25° C.: 20 mPas)

Component B): linear polyester polyol made of adipic acid, ethylene glycol, and 1,4-butanediol, hydroxy number 86 mg KOH/g and functionality 2, viscosity at 25° C.: 250±50 mPas Component C): isosorbide (Addolink® 0312 from Rhein Chemie, hydroxy number 768 mg KOH/g, melting point from 60° C. to 63° C.)

Component D): Toyocat® DB 40: latent catalyst (blocked amine) from TOSOH Corporation Component E): internal release agent Edenor® Ti 05 from Cognis Deutschland, acid number 200 mg KOH/g, functionality 1

Glassfiber textile: HPT 1040-E0/3AC11, 90°/0° from SGL KÜMPERS GmbH & Co. KG, weight per unit area 1036 g/m$^2$ Measuring Equipment and Standards Used:

DSC: DSC Q 20 V24.8 Build 120 from Texas Instruments

DIN EN ISO 53765-A-20: A-20=determination of glass transition temperature with temperature change 20 kelvins/second Gel timer: Gardco GT-SHP-220 from Paul N. Gardner; determination of potlife: this equipment was used to determine the potlife of the resin. The equipment is composed of a stirrer, which is driven by an electric motor. As soon as the maximal torque input in the equipment is reached (the resin then being a high-viscosity or solid material), the motor stops and the gel time can be read from the equipment.

Viscosimeter: MCR 501 from Anton Paar

DIN EN ISO 53019 (d/dt=60 1/s): d/dt=shear rate

DIN EN ISO 14896:2009-07 Method A: Method A=NCO value determination by means of titration Inventive Example 1

10.4 g of component C) were mixed with 20.9 g of component B), 1.5 g of Toyocat® DB 40 and 0.32 g of component E) at 70° C. 59.1 g of Desmodur® XP 2489 were then added at 40° C. and homogenized by a high-speed mixer. A thin film of this mixture was then applied to a glassfiber textile and distributed on the surface, and the material was then stored at −18° C. The NCO value of the prepreg was 11.5% after 24 hours. The prepreg was then pressed at 130° C. and 5 bar to give a fiber-composite component.

Inventive Example 2

10.4 g of component C) were mixed with 20.9 g of component B), 1.5 g of Toyocat® DB 40 and 0.32 g of component E) at 70° C. 109.5 g of Desmodur® XP 2489 were then added at 40° C. and homogenized by a high-speed mixer. A thin film of this mixture was then applied to a glassfiber textile and distributed on the surface, and the material was then stored at −18° C. The NCO value of the prepreg was 15.6% after 24 hours. The prepreg was then pressed at 130° C. and 5 bar to give a fiber-composite component.

Comparative Example 3

21.3 g of component C) were mixed with 42.5 g of component B), 1.5 g of Toyocat® DB 40, and 0.66 g of component E) at 70° C. 137.5 g of Desmodur® VP.PU 60RE11 were then added room temperature and homogenized by a high-speed mixer. A thin film of this mixture was then applied to a glassfiber textile and distributed on the surface, and then stored at room temperature. The NCO value of the prepreg was 14.8% after 24 hours. The prepreg was then pressed at 130° C. and 5 bar to give a fiber-composite component.

Comparative Example 4

21.3 g of component C) were mixed with 42.5 g of component B), 1.5 g of Toyocat® DB 40, and 0.66 g of component E) at 70° C. 75.0 g of Desmodur® VP.PU 60RE11 were then added at room temperature and homogenized by a high-speed mixer. No saturation of glass fibers or production of prepreg was possible because as little as 10 seconds after addition of the isocyanate Desmodur® VP.PU 60RE11 to the mixture of component C, B, D, and E the reaction mixture had completed its hardening.

TABLE 1

| Examples | Inventive example 1 | Inventive example 2 | Comparative example 3 | Comparative example 4 | Data from DE-A 10 2010029355, Example |
|---|---|---|---|---|---|
| NCO/OH equivalent ratio | 1.6:1 | 2.95:1 | 2.95:1 | 1.6:1 | 1:1 |
| Potlife at room temperature | 210 min. | 216 min. | 1 min. 25 sec. | 10 sec. | components in solid form |
| Viscosity at 40° C. (directly after mixing) in | about 2800 mPas | about 3400 mPas | about 10 mPas | not measurable, | melt not homogeneous, |

TABLE 1-continued

| Examples | Inventive example 1 | Inventive example 2 | Comparative example 3 | Comparative example 4 | Data from DE-A 10 2010029355, Example |
|---|---|---|---|---|---|
| [mPas]; in accordance with DIN EN ISO 53019 (d/dt = 60 1/s) | | | | because solid after 10 sec | because melting point of Fineplus ® PE 8078 is >60° C. |
| Storage stability of prepreg [days]; measured on the basis of glass transition temperature $T_g$ in [° C.] in accordance with DIN EN ISO 53765-A-20 | after 7 days: −29° C. after 14 days: −28° C. after 21 days: −22° C. after 49 days: −17° C. | after 7 days: −45° C. after 14 days: −45° C. after 21 days: −45° C. after 49 days: −41° C. | after 7 days: −21° C. after 14 days: −19° C. after 21 days: −9° C. after 49 days: 0° C. | | after 2 days: 50° C. after 17 days: 55° C. after 30 days: 56° C. after 47 days: 55° C. |
| NCO value of prepreg [after . . . days]; measured in accordance with DIN EN ISO 14896: 2009-07 method A in [% by wt.] | after 1 day: 11.5 after 7 days: 11.3 after 14 days: 10.7 after 21 days: 8.2 after 35 days: 8.1 after 49 days: 7.1 | after 1 day: 15.8 after 7 days: 15.8 after 14 days: 15.4 after 28 days: 15.1 after 35 days: 14.1 after 49 days: 13.4 | after 1 day: 14.8 after 7 days: 13.2 after 14 days: 12.9 after 21 days: 12.8 after 35 days: 12.1 after 49 days: 11.7 | | |
| Solidification time of prepreg at elevated temperature | 5 min at 125° C. | 10 min at 125° C. | 2 min at 130° C. | | 30 min; during this period the temperature is raised from 90° C. to 170° C. |
| Glassfiber content in [% by wt.] in accordance with DIN EN ISO 1172 | 48 | 50 | 55 | saturation not possible | >50 |
| Lightfastness of polyurethane matrix | yes | yes | no | no | yes |

The shelf life of the prepreg was determined both on the basis of the glass transition temperature ($T_g$) by means of DSC studies and also on the basis of the NCO value [in % by weight]. The values in the table show that the crosslinkability of the prepreg of the invention was not impaired by storage at −18° C. over a period of 7 weeks.

The solidification time is the time required for full crosslinking of the polyurethane composition, such that no further enthalpy of reaction is detectable for the crosslinking reaction.

Inventive example 2 shows that potlife is only slightly increased by a higher index.

In comparative example 3 and 4 the unblocked aliphatic isocyanate Desmodur® XP 2489 used in the system of the invention in inventive example 1 and 2 was replaced by the unblocked aromatic isocyanate Desmodur® VP.PU 60RE11. It was found here that when the equivalent ratio of NCO/OH was 1.6:1 the reaction rate for the aromatic-based system (comparative example 4) is so high that it was impossible to produce prepregs therefrom.

What is claimed is:

1. A prepreg consisting of a fiber layer saturated with polyurethane (matrix material) that has not been fully hardened and that has an NCO value of from 3% by weight to 17% by weight (DIN EN ISO 14896:2009-07-method A: method A=NCO value determined by titration), and that has a $T_g$-value below 40° C. (glass transition temperature $T_g$ measured in accordance with DIN EN ISO 53765-A-20), wherein the polyurethane is a reaction product of a reaction mixture of:

an isocyanate component consisting of:
  A) one or more organic isocyanates selected from the group consisting of: unblocked aliphatic or cycloaliphatic di- and polyisocyanates, isocyanurates of unblocked aliphatic or cycloaliphatic di- and polyisocyanates, and combinations of any thereof;
and a polyol formulation consisting of:
  B) a polyol component made of one or more polyols with a number-average OH number of from 30 to 1000 mg KOH/g, with a number-average functionality of from 1.9 to 2.5;
  C) one or more dianhydrohexitols;
  D) one or more latent catalysts which are catalytically active at temperatures of from 50° to 100° C.; and
  E) optionally auxiliaries and/or additives, wherein component E) excludes polyepoxides,
  wherein the initial viscosity directly measured after mixing of the reaction mixture at 40° C. is from 2300 to 3200 mPas (measured in accordance with DIN EN ISO 53019), and the ratio of the number of the NCO groups in component A) to the number of the OH groups in components B) and C) is from 1.3:1 to 10:1.

2. A fiber-composite component comprising at least one prepreg as claimed in claim 1, wherein the polyurethane has been fully hardened.

3. A process for the production of the prepreg as claimed in claim 1, wherein:
  i) components B) to D), and optionally E), are mixed at temperatures from 40° to 80° C. to produce a polyol formulation X;

ii) the polyol formulation X from i) is mixed with component A) at temperatures from 10° to 80° C. to produce a reactive mixture; and iii) the reactive mixture from ii) is applied to a fiber layer and is partially cured.

4. A process for the production of the fiber-composite component as claimed in claim 2, wherein:

the one or more prepregs is/are fully hardened at from 110° to 140° C. and at a pressure of from 1 to 100 bar or in vacuo within from 1 to 10 minutes.

5. An article of manufacture comprising the fiber-composite component as claimed in claim 2, wherein the article comprises a sandwich component comprising a core sublayer and an outer layer.

6. A material comprising the article of manufacture of claim 5, wherein the material is selected from the group consisting of a construction material, an aerospace material, a road construction material, a power engineering material, a boatbuilding material, and a shipbuilding material.

7. A bodywork component, an aircraft component, a manhole, a rotor blade of a wind turbine, or a solar reflector comprising article of manufacture of claim 5.

8. The prepreg as claimed in claim 1, wherein the polyol formulation consists of components B), C), D) and E).

9. A process for the production of the prepreg as claimed in claim 8, wherein:

i) components B) to E) are mixed at temperatures from 40° to 80° C. to produce a polyol formulation X;

ii) the polyol formulation X from i) is mixed with component A) at temperatures from 10° to 80° C. to produce a reactive mixture; and iii) the reactive mixture from ii) is applied to a fiber layer and is cured.

10. A process for the production of the prepreg as claimed in claim 8, wherein:

i) components B) to E) are mixed at temperatures from 50° to 70° C. to produce a polyol formulation X.

11. A process for the production of the prepreg as claimed in claim 3, wherein:

i) components B) to D) are mixed at temperatures from 50° to 70° C. to produce a polyol formulation X.

* * * * *